United States Patent [19]

Gräser et al.

[11] 4,107,279

[45] Aug. 15, 1978

[54] PROCESS FOR THE PREPARATION OF AMIDOSULFONIC ACID

[75] Inventors: Reinhold Gräser, Frankfurt am Main; Heinz Karl Hofmeister, Kelkheim; Adolf Metzger, Wiesbaden, all of Fed. Rep. of Germany

[73] Assignee: Hoechst Aktiengesellschaft, Frankfurt am Main, Fed. Rep. of Germany

[21] Appl. No.: 826,712

[22] Filed: Aug. 22, 1977

[30] Foreign Application Priority Data

Aug. 24, 1976 [DE] Fed. Rep. of Germany ....... 2637948

[51] Int. Cl.$^2$ ............................................. C01B 17/00
[52] U.S. Cl. .................................................... 423/389
[58] Field of Search ................................ 423/388, 389

[56] References Cited

U.S. PATENT DOCUMENTS 3,661,516  5/1972  Hofmeister ........................... 423/389

FOREIGN PATENT DOCUMENTS 2,106,019  8/1972  Fed. Rep. of Germany ........... 423/388

Primary Examiner—O. R. Vertiz
Assistant Examiner—Thomas W. Roy
Attorney, Agent, or Firm—Curtis, Morris & Safford

[57] ABSTRACT

When sulfur trioxide is reacted with ammonia, a melted reaction product containing mainly the ammonium salts of amidosulfonic acid and imido-disulfonic acid is obtained. According to the invention the melted reaction product is introduced into mineral acids. From the resulting solution, free amidosulfonic acid precipitates in high yield.

6 Claims, No Drawings

PROCESS FOR THE PREPARATION OF AMIDOSULFONIC ACID

The present invention relates to a process for the preparation of amidosulfonic acid.

It has already been known that in the reaction of sulfur trioxide with ammonia in the absence of water a mixture of the ammonium salts of amido-, imidodi- and nitrilotrisulfonic acids is formed. If the two substances sulfur trioxide and ammonia are reacted in the gaseous phase, a solid, finely divided reaction mixture is formed, if the removal of the reaction heat is ensured.

According to German patent specification No. 668,142, the ammonia is added in a liquid and finely divided form, to improve the carrying-off of the reaction heat. If the solid reaction mixture obtained is subjected to a hydrolysis with mineral acids, amidosulfonic acid precipitates. An appropriate process for this hydrolysis has been described in German Offenlegungsschrift No. 2,106,019.

If the reaction mixture resulting from the reaction of sulfur trioxide with ammonia is to be worked up by hydrolysis to give amidosulfonic acid, the highest possible content of ammonium sulfamate in the mixture is desired, for only this compound yields upon hydrolysis an equimolar amount of amidosulfonic acid. In the acid hydrolysis of the ammonium salts of the imido-disulfonic acid there are formed amidosulfonic acid and ammonium-hydrogenosulfate in equal parts, whereas under the same conditions the ammonium salt of nitrilotrisulfonic acid yields two moles of ammonium hydrogenosulfate per mole of amidosulfonic acid.

For this reason, many attempts have been made to convert ammonium-imido-disulfonate and ammonium-nitrilo-trisulfonate into ammonium sulfamate, or to control the reaction of sulfur trioxide with ammonia in a way as to obtain the largest possible amount of ammonium sulfamate.

In U.S. Pat. No. 3,484,193, a process for the preparation of ammonium sulfamate has been described. According to this process, ammonium-imido-disulfonate is suspended at 150° C in melted ammonium sulfamate, the suspension is subsequently ammonolyzed under ammonia pressure at 280° C, and finally ammonium sulfamate is obtained in a high yield.

U.S. Pat. No. 3,661,516 describes a process in which the reaction of sulfur trioxide and ammonia is carried out in the presence of an amount of ammonia exceeding the amount stoichiometrically necessary for the formation of ammonium amidosulfonate, and at a temperature at which a melted reaction mixture is obtained. The hot reaction mixture is to be reacted preferably with water, in which process step ammonium amidosulfonate, amidosulfonic acid and ammonium sulfate are formed from ammonium-imidodisulfonate and ammonium-nitrilo-trisulfonate. By adding strong mineral acids, the crystallization may be carried on.

It has now been found that amidosulfonic acid may be advantageously prepared from sulfur trioxide and ammonia, if sulfur trioxide and ammonia are reacted to melted reaction products, and the melt is introduced directly into liquid mineral acid. It is advantageous to introduce the melt after cooling it to a temperature above setting point, while it is still in the melted state, into a mineral acid, whose temperature is less than 70° C. In this process it is advantageous to cool the melt prior to its reaction with the mineral acid to a temperature of more than 124° C, especially in the range of from 130° to 170° C, preferably to a temperature of from 140° to 160° C. The temperature of the mineral acid may be far less than 70° C, however, said mineral acid should not yet be solidified. The mineral acid contains preferably from 10 to 50% by weight of water, especially 20 to 40%.

It was a surprising fact, which could not have been foreseen, that according to this process it is not at all necessary to effect a hydrolysis of the hot melt in water for obtaining a full yield of amidosulfonic acid. Especially when using nitric acid it could have been expected that the known reaction of amidosulfonic acid with nitric acid according to the equation $$HSO_3NH_2 + HNO_3 \rightarrow N_2O + H_2SO_4 + H_2O$$

would result in reduced yields due to the formation of nitrous oxide. It should be noted, however, that this reaction is practically no longer observed, if the temperature of the mineral acid is less than 70° C, and it is even completely stopped, if the mineral acid shows a temperature of less than 60° C.

Besides, as the solubility of amidosulfonic acid strongly depends on the acid concentration of the acid used for the hydrolysis, it becomes clear, why there is such an important advantage in introducing the melt directly into the acid. In order to obtain comparable yields of the free amidosulfonic acid, the acid requirement is considerably higher for the hydrolysis with water than with the present process. In the present process the additional addition of strong acids, which is required in the known processes in order to promote the crystallization of the amidosulfonic acid, is no longer necessary.

Furthermore, it is of course a considerable advantage with regard to the process, that it is no longer required to have the melt set first, requiring subsequent breaking and grinding, before reacting with mineral acids to give amidosulfonic acid. These reaction steps are now no longer necessary.

Finally there is also the risk in using a solid reaction product from sulfur trioxide and ammonia, in order to prepare amidosulfonic acid, that the solid matter is not completely dissolved, whereby impurities are introduced into the final product. In contradistinction thereto, in the process of the invention the melt dropping into the mineral acid is dissolved at once, before amidosulfonic acid precipitates from the clear solution by crystallization. This is why the amidosulfonic acid obtained by the reaction of melted products shows an extremely high degree of purity, which is in the range of from 99.7 to 99.9%.

As mineral acids there may be used phosphoric acid, sulfuric acid, hydrochloric acid, and nitric acid. Preference is given to nitric acid, since the ammonium nitrate obtained as by-product may be used advantageously as fertilizer.

The following Examples serve to illustrate the invention.

EXAMPLE 1

10 Kilograms of a melt obtained from sulfur trioxide and ammonia under a pressure of from 6 to 10 atmospheres at a temperature in the range of from 200 to 220° C and having the composition 80.6% by weight of $NH_4SO_3NH_2$ 15.8% by weight of $(NH_4SO_3)_2NH$
3.3% by weight of $(NH_4)_2SO_4$
0.25% by weight of $NH_3$ were cooled to 150° C and introduced into 20 kg of 60% nitric acid, while stirring. The temperature of the nitric acid was 60° C. Upon complete addition of the melt the suspension was cooled to −10° C, the amidosulfonic acid precipitation by crystallization was filtered off, the precipitate was washed with 60% nitric acid at −10° C and dried at 70° C. 6.67 Kilograms of amidosulfonic acid were obtained which had a degree of purity of 99.7%.

COMPARATIVE EXAMPLE 1

10 Kilograms of a solid product having the composition
81.4% of $NH_4SO_3NH_2$
15.5% of $(NH_4SO_3)_2NH$
3.15% of $(NH_4)_2SO_4$
0.13% of $NH_3$ were introduced in the solid state into 20 kg of 60% nitric acid. Otherwise, the process was carried out according to the reaction conditions mentioned in Example 1.

In this process, 6.68 kg of amidosulfonic acid were obtained which had a degree of purity of 98.05%.

COMPARATIVE EXAMPLE 2

3 Kilograms of a melt of 150° C having the composition
80.7% of $NH_2SO_3NH_4$
15.7% of $NH(SO_3NH_4)_2$
5.4% of $(NH_4)_2SO_4$
0.2% of $NH_3$ were introduced into 3 kg of water, and subsequently 6 kg of 60% nitric acid were added at 60° C. The precipitate was filtered off upon cooling the suspension to −10° C, was then washed with 60% nitric acid at −10° C and subsequently dried at 70° C. 1.7 Kilograms of amidosulfonic acid were obtained, which corresponded to a yield of 59.8%.

As compared against the hydrolysis with nitric acid, the hydrolysis with water and the use of corresponding amounts of acid result in a reduction of the yield by about 15%, if calculated absolutely.

What is claimed is:

1. A process for the preparation of amidosulfonic acid consisting essentially of reacting sulfur trioxide and ammonia to produce a melt of reaction products; and reacting the melted reaction products directly with a mineral acid.

2. Process as claimed in claim 1, which comprises cooling the melted products to a temperature above setting point and subsequently reacting them with mineral acid.

3. Process as claimed in claim 1, which comprises cooling the melted products to a temperature in the range of from 130° to 170° C, and subsequently reacting them with mineral acid.

4. A process as claimed in claim 1 wherein the melted reaction products are cooled to a temperature in the range of 140° to 160° C and subsequently reacted with a mineral acid.

5. Process as claimed in claim 4, wherein the temperature of the mineral acid is less than 70° C.

6. Process as claimed in claim 5 which comprises using as mineral acid a nitric acid having a concentration of 60% or more.

* * * * *